Figure 1:
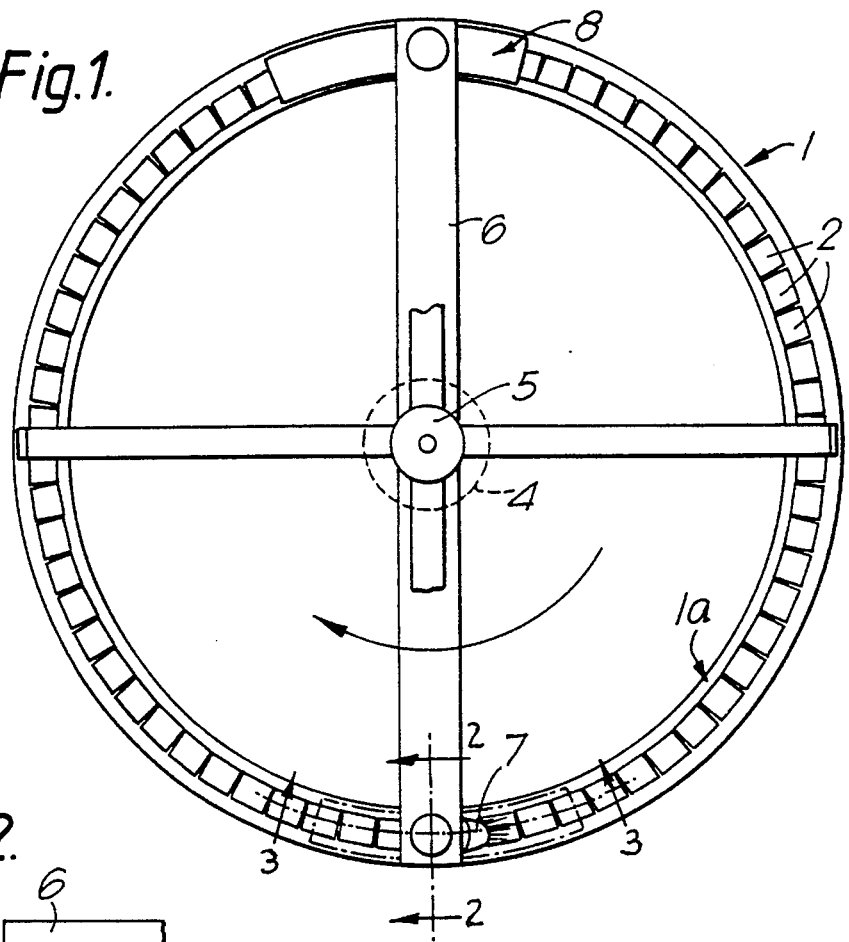

United States Patent [19]
Vastveit

[11] Patent Number: 5,462,232
[45] Date of Patent: Oct. 31, 1995

[54] ROTATING LIQUID DISTRIBUTOR FOR USE WITH A SPREADER FOR LIQUID MANURE OR OTHER FLUIDS

[76] Inventor: Kjell Vastveit, N-4160 Judaberg, Norway

[21] Appl. No.: 137,065

[22] PCT Filed: Apr. 15, 1992

[86] PCT No.: PCT/No92/00076
§ 371 Date: Oct. 15, 1993
§ 102(e) Date: Oct. 15, 1993

[87] PCT Pub. No.: WO92/17996
PCT Pub. Date: Oct. 29, 1992

[30] Foreign Application Priority Data

Apr. 19, 1991 [NO] Norway ................................ 911550

[51] Int. Cl.⁶ .................................................. A01C 23/04
[52] U.S. Cl. ............................................ 239/662; 239/251
[58] Field of Search .................................... 239/662, 650, 239/663, 664, 689, 251; 141/97, 125

[56] References Cited

U.S. PATENT DOCUMENTS

| | | | |
|---|---|---|---|
| 3,570,724 | 3/1971 | Fontein et al. | 222/478 |
| 4,014,271 | 3/1977 | Rohlf et al. | 239/662 |
| 4,489,892 | 12/1984 | Tyler | 239/664 |
| 5,271,567 | 12/1993 | Bauer | 239/662 |

FOREIGN PATENT DOCUMENTS

| | | | |
|---|---|---|---|
| 1115600 | 1/1982 | Canada . | |
| 0079018 | 5/1983 | European Pat. Off. . | |
| 3703743 | 1/1988 | Germany . | |
| 1351529 | 11/1987 | U.S.S.R. | 239/689 |
| 87/02861 | 5/1987 | WIPO . | |

Primary Examiner—Karen B. Merritt
Attorney, Agent, or Firm—Rodman & Rodman

[57] ABSTRACT

The rotating liquid distributor includes a circular distributor housing with an upwardly open annular channel. The channel bottom has spaced outlet openings at an even mutual distance. A supply pipe for liquid under pressure is centrally mounted in the distributor housing and is connected to a vertical, rotatably mounted hollow rotor stem with an upper transveral hollow rotor arm. Downwardly slanted nozzles extend from the rotor arm, flush with the outlet openings to produce a turning moment through the supply of liquid under pressure. The downwardly slanted nozzle is surrounded by a screen with an upside down U-shaped cross section. The screen has sidewalls that extend down into the annular channel on each side of the downwardly slanted nozzle in order to catch liquid splashed. A transporting roller which fills out the cross section of the annular channel, is fastened by a draw bar to the rotor arm. Thereby any particle deposits in the annular channel will loosen and liquid leaks will be transported to and forced through the outlet openings. Accumulation of liquid in the lowest portion of the annular channel is avoided, through a slant position of the liquid distributor, and an even distribution of supply of liquid to the outlet openings is achieved. An even fertilization is thus achieved through the use of the liquid distributor with connected equipment when driven across uneven fields.

8 Claims, 1 Drawing Sheet

ROTATING LIQUID DISTRIBUTOR FOR USE WITH A SPREADER FOR LIQUID MANURE OR OTHER FLUIDS

The present invention relates to a rotating liquid distributor used together with a spreader for liquid manure, water or other liquid, possibly including other compounds.

Such rotating liquid distributors for the distribution of liquids, possibly a liquid with a powder or other coarser particles added, such as liquid manure from livestock and possibly mixed with additional liquid, for instance water, are known from SE-8505255-3 (publication No. 457.404). The rotating liquid distributor comprises, according to the publication, a round container divided into compartments which make up a wreath, and which has outlet openings from each compartment connected to outlet pipes or hoses. A rotor with outlet nozzles is centrally positioned in the container and is operated by means of outflowing hydraulic pressure from the nozzles, so that liquid is evenly distributed to the compartments. When the liquid distributor is in a slant position, the liquid will collect in the compartments and possibly flow over the inner, lowest wall of the compartments, at the greatest distance from the outlet openings. This may cause uneven distribution of the outflowing liquid through hoses/pipes to the spreader boom or hoses trailing behind a farm implement which comprises a manure container supplying liquid manure under pressure to the liquid distributor.

From DE-3703743 C2 is known a rotating liquid distributor with a circular distribution housing with peripherally spaced outlet openings connected to outlet hoses and with a driven rotor which supplies liquid under pressure to the outlet openings in the distributor housing. On account of leakage between the outlet opening of the rotor or the nozzle and the outlet opening, the distributor housing may be filled with liquid which, while the liquid distributor is in a slant position, may flow out of the other outlet openings, thereby causing an uneven liquid supply to the various outlet openings and hoses.

From EP-0079018 is known a rotating liquid distributor with a circular distributor housing where the outlet openings are positioned in the side walls of the housing. A driven rotor with outlet openings/nozzles for liquid under pressure sprays the liquid into the outlet openings, connected to hoses which transport the distributed liquid to a spreader boom mounted at the rear of a farm implement, for instance a trailer with a manure container and a pump for supplying the liquid manure to the liquid distributor. Here too liquid may leak out between the rotor's nozzle opening and the outlet pipes in the distributor housing, thereby filling the distributor housing so that liquid may flow out uncontrolled through the outlet openings which at that moment are not covered by the nozzle openings of the rotor. This may also cause an uneven flow of liquid through the outlet openings and the hoses when the liquid distributor is in a slant position.

The purpose of the present invention is to produce a rotating liquid distributor where said drawbacks with uneven liquid distribution to the outlet openings and the thereto connected hoses/pipes are removed, as well as to produce a rotating liquid distributor with a simpler construction of the distributor housing compared to a distributor housing which is divided into a number of compartments by means of radial partitions as shown in the above-mentioned SE- 8505255-3.

The invention accordingly comprises the constructions hereinafter described, the scope of the invention being indicated in the claims.

Thus a rotating liquid distributor is obtained where the liquid flow from the peripherally positioned outlet openings with connected hoses, remains as good as even when the liquid distributor is at a slant, which may happen when the liquid distributor is placed on a trailer with a manure container which supplies the liquid distributor with liquid manure under pressure, when said trailer is driven across a sloping terrain; needless to say, the same applies when the vehicle is driven down or up an incline.

Figure 2:
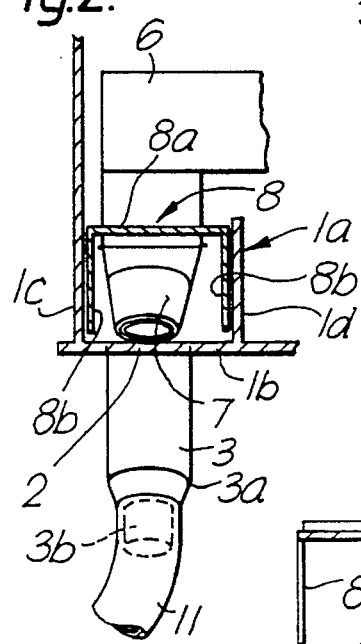
Figure 3:
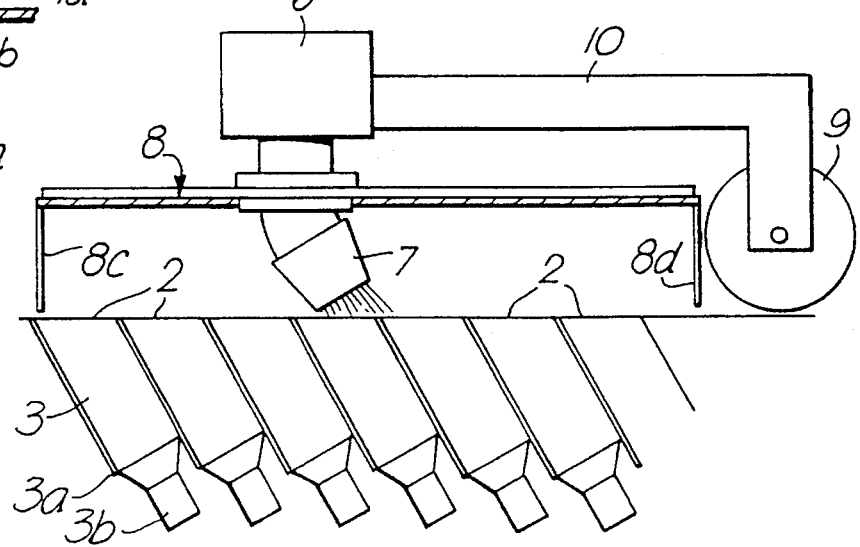

The invention will be described in more detail in the following with reference to the drawing, which schematically shows the liquid distributor, and where FIG. 1 shows a top view of the liquid distributor, FIG. 2 shows a detail in cross section along line 2—2, and FIG. 3 shows a detail in cross section along line 3—3.

FIG. 1 shows the top view of the rotating liquid distributor, comprising a circular distributor housing 1 with outlet openings 2 peripherally spaced in the horizontal bottom of the housing. Outlet openings 2 are connected to slanting outlet pipes 3 which are placed adjacent to each other and which at the lower end 3a are connected to outlet nozzles 3b with a smaller cross-sectional area than outlet pipes 3. Centrally in the distributor housing there is placed a supply pipe 4 for the supply of liquid/liquid manure under pressure from a tank, not shown, for instance on a trailer, which is connected to a vertical, rotatably mounted hollow rotor stem 5 with an upper transverse hollow rotor arm 6 which stretches across the distributor housing 1 and is equipped with a down-turned nozzle 7 at each end. Nozzles 7 are flush with the outlet openings 2 and are placed at a slant in order to produce a turning moment through the supply of a liquid under pressure, thereby rotating while at the same time distributing the outflowing liquid to said outlet openings 2.

As can be seen from FIG. 2, the distributor housing 1 comprises an open annular channel 1a with bottom 1b and outer and inner side walls 1c, 1d. The outlet holes 2 are spaced at an even mutual distance in the bottom 1b of the annular channel 1a. Nozzle 7 on the rotor arm 6 extends down between the sidewall 1c, 1d of the annular channel 1a. To nozzle 7 or the end portion of rotor arm 6 there is fastened a screen 8 with a U-shaped cross section with bottom 8a up and with its side walls 8b extending down into the annular channel 1a on each side of nozzle 7 which is led through the upward facing bottom 8a of screen 8.

Screen 8 is elongated and curved in its longitudinal direction in order to fit into the circular annular channel 1a and extends over at least three outlet openings 2, (in FIG. 1 over approximately 7 outlet openings 2).

Screen 8 may be closed at at least one end or possibly both ends 8c,8d, whereby liquid leaks between nozzle 7 and outlet opening 2 will be caught by screen 8 and will be limited with regard to escape into annular channel 1a of closed ends 8c,8d of screen 8, so that the leaked liquid may flow down into outlet openings 2 which are spaced longitudinally in screen 8.

Because sidewalls 8b of the screen extend almost down to bottom 1b of annular channel 1a, and also are in close proximity to the outer and inner sidewalls 1c,1d of annular channel 1a, they will function as a scraper and loosen and possibly break up deposits from particles from the liquid when the liquid consists of for instance liquid manure, which scrapings on account of the liquid flow from nozzle 7 may be transported by this flow down into outlet openings 2. When for instance screen 8 is closed at one end or both ends 8c,8d, these end walls will also function as scrapers and transporting means for particles and thereby facilitate further transport of these out through outlet openings 2.

In case screen 8 is open at its ends 8c,8d, possibly only at its rear end 8d, there may be mounted a transporting means 9 behind screen 8 as illustrated in FIG. 3, which fills out the cross section of annular channel 1a and transports leaked liquid, if any, so that this flows out through outlet openings 2. This means that the transporting means 9 prevents accumulation of liquid in the lowest areas of annular channel 1a, in case the liquid distributor has an incline/is placed at a slant, whereby uneven distribution of liquid to outlet openings 2 is avoided. Thereby irregular fertilization of an uneven field, meadow, etc., is also avoided, as mentioned in the introduction.

Transporting means 9 in the form of a rotatable roller which fills out the cross section of annular channel 1a is fastened to rotor arm 6 via a draw bar 10, as shown in FIG. 3.

Outlet pipes 3 for outlet openings 2 are placed at a slant, flush with the inclined position of nozzle 7 as shown in FIG. 3, whereby is achieved the previously mentioned rotation of rotor arm 5, at the same time as liquid from nozzle 7 flows directly into said outlet pipe 3 via outlet openings 2.

At their lower ends 3a, outlet pipes 3 are connected to hose connecting nozzles 3b with a smaller cross-sectional area than the cross-sectional area of outlet pipes 3. Outlet pipes 3 thus create chambers which are able to take up liquid leaks located under screen 8 or possibly are transported in the annular channel by means of transporting means 9. A more even outflow of liquid from said chamber is thereby achieved, through hose connecting nozzles 3b and the thereto coupled hoses 11 which lead the liquid/liquid manure mixture down to the ground, possibly to an outlet on a transverse boom mounted at the rear of the previously mentioned trailer, for an even distribution of liquid transversely to the direction in which the trailer is moving.

I claim:

1. A rotating liquid distributor for a spreader of liquid manure, water or other liquid compounds comprising
    a) a non-rotatable circular distributor housing with a horizontal bottom, an annular channel that opens upwards from the horizontal bottom, at a peripheral portion of the horizontal bottom, said annular channel including a radially inner side wall and a radially outer side wall,
    b) outlet openings in the horizontal bottom at the peripheral portion spaced between the radially inner and radially outer side walls of the annular channel and distributed around said peripheral portion,
    c) hose members extending downwardly from the respective outlet openings in the horizontal bottom,
    d) a rotatable hollow vertical rotor stem centrally positioned in the distributor housing for rotation about a vertical axis, said rotor stem being adapted to receive a supply of liquid under pressure, a hollow transverse radial rotor arm coupled to the rotor stem such that the hollow space within the rotor stem communicates with the hollow space within the rotor arm and the rotor arm is rotatable with the rotor stem, said rotor arm having at least one nozzle slanted downwardly toward the horizontal bottom in flush radial alignment with the outlet openings in the horizontal bottom,
    e) a screen with a U-shaped cross-section joined to said at least one nozzle for positioning within the annular channel such that the open end of the U-shaped cross-section extends downwardly into the annular channel, said screen including opposite side walls corresponding to the radially inner and radially outer side walls of the annular channel, and a base joining the opposite side walls, the base being in an upper position relative to a nozzle opening of the at least one nozzle, and the opposite side walls of the screen being disposed alongside the corresponding side walls of the annular channel, whereby liquid supplied under pressure to said hollow rotor stem produces a turning moment in said rotor arm when the liquid is dispensed from said at least one nozzle into said outlet openings and through said hose members.

2. A rotating liquid distributor according to claim 1 wherein said screen extends over at least three of said outlet openings.

3. A rotating liquid distributor according to claim 1 wherein said screen has opposite end portions and at least one of said end portions is a closed end.

4. A rotating liquid distributor according to claim 1 wherein said screen has opposite ends and a transport means is positioned behind one end of the screen, said transport means extending down into the annular channel and being connected to the rotor arm by a draw bar.

5. A rotating liquid distributor according to claim 4 wherein said transporting means includes a rotatable roller which occupies substantially the entire cross-sectional width of the annular channel such that the roller is engageable with any material that adheres to or lies across the edges of the outlet openings to force such material into the outlet openings.

6. A rotating liquid distributor according to claim 1 wherein the hose members have a main section and a hose nozzle at a lower end of the main section, the hose nozzle having a smaller cross-sectional area than the main section.

7. A rotating liquid distributor according to claim 1 wherein the hose members are slanted downwardly from the horizontal bottom at the same angle that the at least one nozzle of the rotor arm is slanted downwardly toward the horizontal bottom.

8. A rotating liquid distributor according to claim 1 wherein two of said hollow transverse radial rotor arms are coupled to the rotor stem such that the at least one nozzle on each rotor arm is diametrically opposite the other and they extend into opposite portions of the annular channel.

* * * * *